United States Patent

[11] 3,616,183

[72] Inventors John Raymond Brayford;
Ian Stuart Fisher; Michael Mundie Robertson, all of Harrogate, England
[21] Appl. No. 807,919
[22] Filed Mar. 17, 1969
[45] Patented Oct. 26, 1971
[73] Assignee Imperial Chemical Industries Limited London, England
[32] Priority Mar. 22, 1968
[33] Great Britain
[31] 13988/68

[54] POLYESTER SHEATH-CORE CONJUGATE FILAMENTS
20 Claims, No Drawings

[52] U.S. Cl. .................................................. 161/175, 264/171
[51] Int. Cl. ................................................. D01d 5/28
[50] Field of Search .......................................... 161/172, 175; 260/860; 264/171

[56] References Cited
UNITED STATES PATENTS
2,987,797  6/1961  Breen .......................... 161/173
3,329,557  7/1967  Magat et al. ................ 260/873 X OTHER REFERENCES
D. Coleman, Block Copolymers: Copolymerization of Ethylene Terephthalate and Polyoxyethylene Glycols Jour. Polymer Science, Vol. XIV, pp. 15–27 (1954).

Primary Examiner—Robert F. Burnett
Assistant Examiner—Raymond O. Linker, Jr.
Attorney—Cushman, Darby & Cushman ABSTRACT: Sheath/core conjugate filaments which combine the tensile properties of poly(ethylene terephthalate) as core with the surface properties of a copolyester of ethylene terephthalate/polyoxyethylene terephthalate as sheath.

POLYESTER SHEATH-CORE CONJUGATE FILAMENTS

The present invention relates to the preparation of conjugate polyester fibers having good soil-release properties and good antistatic properties, these properties being permanent under very stringent treatment conditions.

According to the present invention we provide a process for the preparation of a conjugate polyester filament by the extrusion in sheath/core relationship of (a) a stream of molten, fiber-forming, linear polyester or copolyester based on a simple glycol, or of molten, fiber-forming copolyester in the molecular chain of which there are, in addition to units based on a simple glycol, poly(alkylene oxide)-containing units in proportion such as would result from the reaction of less than 5 parts by weight of poly(alkylene oxide) per 100 parts by weight of the final copolyester, and (b) a stream of fiber-forming copolyester, or a fiber-forming admixture of copolyester, having structural units containing poly(alkylene oxide) radicals, the proportion of the structural units containing poly(alkylene oxide) radicals being such as would result from the reaction of not less than 5 and not more than 60 parts by weight of poly(alkylene oxide) of average molecular weight at least 500, per 100 parts by weight of the final copolyester or copolyester admixture, (a) being the core and (b) being the sheath, allowing the composite stream to solidify to form a filament and subsequently cold drawing.

According to a preferment of our invention, in a fiber-forming copolyester used for the core the proportion of units which are poly(alkylene oxide) containing should not exceed that corresponding to that which would result from the reaction of 3 parts by weight of poly(alkylene oxide) per 100 parts by weight of the final copolyester.

Our invention also includes sheath-core conjugate filaments made according to the process of our invention.

By the term "simple glycol" we mean a glycol which is not a polyglycol. Examples of simple glycols are those having the general formula $HO(CH_2)_nOH$, wherein $n$ is not less than 2 and not greater than 10, and 1:4-(hydroxymethyl) cyclohexane. In the term simple glycol we also include more than one simple glycol.

Preferably the proportion of structural units of the component (b) which are derived from poly(alkylene oxide) does not exceed that which would result from the reaction of 40 parts by weight of poly(alkylene oxide) in the formation of 100 parts by weight of the final copolyester or copolyester admixture.

In order to avoid spun yarn stickiness, which leads to difficulty in unwinding packages of spun yarn during drawing, it is preferable that the proportion of structural units of the components (b) which are derived from poly(alkylene oxide) is not excessive. This proportion may be greater in the case of a higher molecular weight poly(alkylene oxide) than in the case of a lower molecular weight poly(alkylene oxide). This relationship is illustrated in the examples given hereinafter.

By the term "admixed copolyester" we mean a mixture containing a copolyester of which a proportion of its structural units contain poly(alkylene oxide) radicals; the admixed copolyester may be a mixture of more than one copolyester; more than one copolyester present may contain structural units based on poly(alkylene oxide). Thus it is necessary that the component (b) should contain poly(alkylene oxide) of average molecular weight of at least 500 in combined form equivalent to at least 5 and not in excess of 60 parts by weight of poly(alkylene oxide) per 100 parts by weight of the component (b).

We have found particularly advantageous the use as component (b) of a copolyester or admixed copolyester which is fiber-forming and which has an effective melting point not less than 200° C. These conditions favor successful extrusion to form filaments and successful orientation by cold drawing. It is not, however, essential that the copolyester containing poly(alkylene oxide) units should in itself be fiber-forming when it is only a constituent of the fiber-forming component (b).

An advantage of the process of our invention is that by means of it filaments may be produced having adequate tensile crease resistant and pleat retention properties for all normal fiber uses and at the same time having good antistatic properties and having good soil-release properties, these properties being permanent under very stringent treatment conditions, and these fibers having excellent stability towards the irradiation by ultraviolet radiation, and dyestuffs introduced into such fibers having high light fastness.

Such an advantageous combination of properties cannot be obtained in, for example, a homofilament of a polyester or ensure a copolyester which does not have poly(alkylene oxide) units in its molecule or a homofilament which has a proportion of its structural units containing terephthalate) oxide) radicals such as would result from the reaction of not less than 5 28 parts by weight of poly(alkylene oxide) per 100 parts by weight of the final copolyester.

Thus the filaments of our invention have in the sheath a greater proportion of combined poly(alkylene oxide) than is found in the core. Preferably the proportion of combined poly(alkylene oxide) in the core should be less than that which would result from the reaction of 5 parts by weight of poly(alkylene oxide) per 100 parts by weight of the core material. There may advantageously be no poly(alkylene oxide) in the core and we have found that all benefits of our invention are fully realized when the proportion of poly(alkylene oxide)-containing units is such as would result from the reaction of as much as 3 parts by weight of poly(alkylene oxide) per 100 parts by weight of the final copolyester.

The proportion of the conjugate filament cross section which is composed of the component (b) should be sufficient to provide an entire sheath about the core, on the other hand such proportion should not be so great that the dye-fastness and light-resistance properties are adversely affected. After subjecting the sheath core filaments of our invention to a dyeing procedure, the resultant and exemplified may be reduction cleared, according to known technique and exemplified in the examples hereinafter. This treatment results in removal of the dyestuff from the sheath of the filaments so that the lack of dye-fastness and the lack of light resistance normally associated with the presence of dyestuff in the material of which the sheath is composed is no longer a problem. On the other-hand, the presence of dyestuff in the core of the filaments ensures the desirable colored appearance of the filaments and the dyestuff in the core is fast and light resistant. Thus the proportion of the cross-sectional area being composed of component (b) should be not less than 5 percent and not greater than 40 percent. Provided these requirements are met, the filaments may be of concentric or eccentric conformation and of circular or noncircular cross section.

Any convenient method may be used for the formation of the conjugate stream of (a) in (b) examples of which are;

i. the combination in appropriate configuration of a polymer of type (a) with a polymer of type (b), by, for example, the use of the apparatus described in U.S. Pat. No. 3,457,342.

ii. the splitting of a stream of a molten polyester or copolyester of type (a) into two streams, the incorporation into one stream of a poly(alkylene oxide) under such conditions that it reacts to form a modified copolyester and recombination of the two streams in sheath core relationship with the modified stream as the sheath.

iii. the splitting of a stream of molten polyester or copolyester of type (a) into two streams, the incorporation into one of the streams of the polyester of a copolyester of which a relatively high proportion of the structural units are poly(alkylene oxide)-containing units and recombination of the two streams in sheath core relationship with the modified stream as the sheath. In this method, as opposed to method (ii), it is optional whether the conditions are or are not such that reaction takes place between the components of the modified stream.

In each of the cases (i), (ii) and (iii) it is necessary that the requirements hereinbefore stated should be fulfilled, that is the core should either be of a polyester or of a copolyester of which the proportion of structural units which contain poly(alkylene oxide) is less than that which would result from the reaction of 5 parts by weight, and preferably no more than that which would result from the reaction of 3 parts by weight, of polyalkylene oxide per 100 parts by weight of final copolyester, and the sheath should contain at least that proportion of units containing poly(alkylene oxide) radicals corresponding to 5 parts of poly(alkylene oxide) per 100 parts by weight of sheath component, regardless of whether there is one molecular species containing poly(alkylene oxide) radicals, or more than one molecular species containing poly(alkylene oxide) radicals, and also regardless of whether or not all molecular species present contain poly(alkylene oxide) radicals. The poly(alkylene oxide) having should preferably be poly(ethylene) oxide or poly(propylene oxide), having an average molecular weight not less than 1,000 and not greater than 20,000. Preferably the average molecular weight should be not greater than 6,000. The average molecular weight in question is that for a distribution of molecular weight of poly(alkylene oxide) as manufactured.

Examples of suitable dicarboxylic acids on which the polyesters or copolyesters of sheath of core may be based are terephthalic, naphthalene-2:6-dicarboxylic and 1:2-diphenoxyethane-4:4'-dicarboxylic acids. Suitable second dicarboxylic acids for such copolyesters as have such, are, for example, adipic, isophthalic and sulfoisophthalic acids. A proportion or the whole of the units of which the polymer or polymers comprising the component (b) is or are composed may differ from the units of the polymer of component (a), for example, in respect of the dicarboxylic acid on which the units are based.

The most effective polyester for the core is poly(ethylene terephthalate). It is most practicable for the sheath material to be of a single copolyester of ethylene terephthalate having as other than ethylene terephthalate structural units only poly(oxyethylene) terephthalate units.

The filaments manufactured according to the process of our invention may be produced by the use of a multihole spinneret to form a yarn which may be oriented by cold drawing according to methods known in the art.

Each of the components (a) and (b) may optionally contain additives commonly present, and in the proportion commonly used, to produce desired effects, for example coloring materials, delustrants, dyeing additives and stabilizers. Such effects may be confined to the sheath or to the core.

The filaments of our invention may be used in all textile uses, as continuous filament or staple fiber alone or in admixture with other filaments or fibers particularly where soil is a problem, and where antisoiling and antistatic properties are important.

In order that the process of our invention may the more fully be understood, we give hereinafter examples of methods in which it may be put into practice.

In the following examples by Viscosity Ratio we mean the ratio $\eta$ where $\eta$ is viscosity of the solution of polymer and $\eta$ is the viscosity of the pure solvent. Determination of Viscosity Ratio was carried out at 25° C. in orthochlorophenol at a concentration of 1 g. of polymer to 100 ml. of solvent.

EXAMPLE 1

A mixture of bis($\beta$-hydroxyethyl) terephthalate, (1,070 parts), poly(ethylene oxide) of average molecular weight 4,000 (730 parts) and antimony trioxide (1.46 parts) was heated under an atmosphere of nitrogen in a stainless steel autoclave to a temperature of 260° C. The temperature was maintained at 255°–265° c. while the pressure was reduced to less than 0.2 mm. of mercury over a period of 1 hour and polymerization was continued at 255°–265° C. for a further 3 hours. The pressure was then restored to atmospheric. Dry poly(ethylene terephthalate) chip of Viscosity Ratio 1.81 (1,400 parts) and 2:4-dimethyl-6-$\alpha$-methylcyclohexylphenol (40 parts) (as stabilizer) were added to the autoclave, the pressure reduced to 0.3 mm. of mercury and the temperature raised to 275° C. over a period of 1 hour with continuous agitation. The resultant product was a polyester blend having Viscosity Ratio 2.06 and a crystalline melting point of 231° C.

A sheath-core yarn was spun by melt-spinning according to method (i) described hereinbefore, using the resultant polyester blend as the sheath component and poly(ethylene terephthalate) of Viscosity Ratio 1.81 as the core and using a core to sheath ratio 2:1 by volume. Extruder temperatures of 275°–285° C. and 260°–270° C. were used for the core and sheath respectively. The spun yarn had a denier of 350 and comprised 36 filaments. The spun yarn was drawn over a pin at 85° C. and a plate at 175° C. using a draw ratio of 3.22 to 1 giving a drawn yarn having tenacity 3.6 g. per denier, extension 31 percent and shrinkage 5.6 percent.

Samples of the drawn yarn were knitted into hoselegs and subjected to the following conditions of vat dyeing. A knitted sample was heated at 60° C. with an aqueous solution of sodium hydroxide (25 g. per liter) and sodium hyposulfite ($Na_2S_2O$) (17.5 g. per liter) for 1 hour using a liquor-to-fabric ratio of 40:1. The fabric was then rinsed thoroughly in water, dried, rinsed in distilled water containing potassium bromide (1.5 g. per liter), spin dried for 2 minutes and tumble dried at 60° C. The lengthwise electrical resistance of the fabric sample, 7 inches by 1.5 inches and comprised of six fabric layers, was $3.0 \times 10^4$ megohms, measured at 65 percent relative humidity. This may be compared with an identical test carried out on fabric otherwise identical but composed of 100 percent poly(ethylene terephthalate) yarn, both before and after the alkali treatment, for which the electrical resistance was greater than $10^7$ megohms in each case.

EXAMPLE 2

Poly(ethylene terephthalate) was prepared by polycondensation of bis($\beta$-hydroxyethyl terephthalate) (2,000 parts) using antimony trioxide as catalyst. Polycondensation was stopped when the desired level of melt viscosity was reached (about 1,000 poises at 285° C.) as judged by previous knowledge of the relationship between the melt viscosity and the power required to drive the agitator. The poly(ethylene terephthalate) product was mixed in the molten state at 270° C. with poly(ethylene oxide) of average molecular weight 5,000 (500 parts) and the reaction mixture was subjected to polycondensation conditions at 270° C. until the desired level of melt viscosity was reached as judged by previous knowledge of the relationship between melt viscosity and power required to drive the agitator. The reaction product was then a copolyester derived from 25 parts by weight of poly(ethylene oxide) per 100 parts by weight of the final copolyester and was of Viscosity Ratio 2.01.

A 36-filament sheath-core yarn was spun according to method (i) described hereinbefore, the core being formed from poly(ethylene terephthalate) of Viscosity Ratio 1.81 and the sheath being formed from the copolyester of which the preparation is described in this example. The ratio of the cross-sectional areas of core to sheath was 5.7:1. The extrusion temperatures for core and for sheath were respectively 280° C. and 270° C. The spun yarn had denier 435. The spun yarn was drawn over a pin at 85° C. and a plate at 175° C. using a draw ratio of 3.65 to 1 to give a drawn yarn having tenacity 5.4 g. per denier and extension 14 percent.

Samples of the drawn yarn were knitted into hoselegs and subjected to the following conditions of carrier dyeing. A knitted sample was added to a solution of the sodium salt of methylene dinaphthalene sulfonic acid (0.01 g. per liter) in sufficient water to give 30:1 liquor to sample by weight and 30 percent acetic acid (4.8 ml. per liter) at 40° C. The dyestuff Color Index Disperse Yellow 39 (2 percent) by weight on the knitted sample was added to the liquid, which was raised to the boil. To the boiling liquid there was added sufficient o,o'- dihydroxydiphenyl in the form of a strong aqueous solution so that the final solution contained 3.5 g. per liter. The solution was maintained at the boil for a further 60 minutes. The fabric was then firstly reduction cleared by treating in an aqueous bath of cetyl trimethyl ammonium bromide (0.28 g. per liter), a condensate of cetyl alcohol and 22 mols per mol. of ethylene oxide (0.28 g. per liter), sodium hyposulfite (2 g. per liter) and sodium hydroxide (2 g. per liter) at 50° C. for 20 minutes and then soaped by treating in a bath of sodium oleyl sulfate (1 g. per liter) and sodium carbonate (1 g. per liter) at 65°–70° C. for 20 minutes. The fabric was then rinsed thoroughly in water, dried, rinsed in distilled water containing potassium bromide (1.5 g. per liter) spin dried for 2 minutes and tumble dried at 60° C. The lengthwise electrical resistance of the fabric sample, 7 inches by 1.5 inches and consisting of six fabric layers, was $9 \times 10^3$ megohms, measured at 65 percent relative humidity. This may be compared with the results of an identical test carried out on fabric otherwise identical but composed of 100 percent poly(ethylene terephthalate) yarn, for which the electrical resistance was greater than $10^7$ megohms. The wettability and oil displacement by water was greatly superior for the fabric derived from the sheath-core filaments of our invention as compared with that of filaments of 100 percent poly(ethylene terephthalate). Thus this example demonstrates that the improved properties conferred by our invention are not destroyed by the hot alkaline conditions of dyeing and reduction clearings.

When poly(alkylene oxide) is present in a polyester as such, rather than in the form of chain-linking units, the resultant antistatic effect of the polymer is not durable, that is it is removed by simple washing.

This distinction is illustrated by examples 3–5.

EXAMPLE 3

A sheath-core conjugate yarn of 36 filaments and 5 denier per filament is spun and drawn according to the method described in example 2. The core was poly(ethylene terephthalate) of Viscosity Ratio 1.81 and occupied 85 percent of the cross-sectional area of the filament. The sheath was a copoly(ethylene terephthalate) of Viscosity Ratio 1.70 containing units derived from poly(ethylene oxide) of average molecular weight 5,000 in quantity such as would result from the reaction of 15 parts by weight per 100 parts by weight of the final copolyester.

EXAMPLE 4

Poly(ethylene terephthalate) of Viscosity Ratio 1.81 was blended with poly(ethylene glycol) of average molecular weight 20,000 in an amount to give a resultant dispersion containing 15 parts by weight of the poly(ethylene glycol) per 100 parts by weight of the total blend, the blending being carried out so that reaction did not occur to cause incorporation of the poly(ethylene glycol) into the poly(ethylene terephthalate) chains. The blend was melt spun and drawn in the conventional way according to example 2 to form yarn of 36 filaments and 5 denier per filament.

EXAMPLE 5

The yarns from examples 3 and 4 were knitted to hoseleg fabrics and then washed in a dilute detergent solution at 60° C. for 6 minutes. The lengthwise electrical resistances of the washed fabric samples were then measured at 65 percent relative humidity as described in example 2. The washed fabric form example 4 had a resistance greater than $10^7$ megohms (i.e. beyond the range of the instrument used) and also showed a strong tendency to form static changes.

In contrast, the washed fabric from the yarn of our convention (example 3) had a resistance of $7 \times 10^5$ megohms and showed good resistance to developing a static charge.

EXAMPLE 6

A drawn sheath-core filament yarn of 36 filaments and 4 denier per filament was prepared according to the method described in example 2 the core being of poly(ethylene terephthalate) of Viscosity Ratio 1.81 and occupying 85 percent of the cross-sectional area of the filament and the sheath being of a copolyethylene terephthalate such as would result from the reaction of 18 parts by weight of poly(ethylene oxide) of average molecular weight 5,000 per 100 parts by weight of the final copolyester and of Viscosity Ratio 1.91.

EXAMPLE 7

A filament yarn was prepared by melt spinning the copoly(ethylene terephthalate) used as the sheath material in example 6 and drawn to give a drawn yarn of 36 filaments and 4 denier per filament.

The yarns of examples 6 and 7 together with a yarn from poly(ethylene terephthalate) of Viscosity Ratio 1.81 and otherwise identical with the yarns of examples 6 and 7 were exposed under zero tension in a Weather-O-meter for the times stated in table 1. The figures given in the Table are the tenacity values for the various yarns after the various times of exposure.

Table 1

| Number of hours of exposure | Tenacity g. per denier | | | |
| --- | --- | --- | --- | --- |
| | NiL | 50 | 100 | 150 |
| SAMPLE | | | | |
| Poly(ethylene terephthalate) control | 4.2 | 3.8 | 3.6 | 3.5 |
| Conjugate filament yarn of example 6 | 3.9 | 3.5 | 3.2 | 3.1 |
| Filament yarn of example 7 | 3.6 | 2.6 | 2.3 | 2.2 |

It can be seen that as regards retention of tenacity the yarn of example 6 is almost as good as the poly(ethylene terephthalate) while the yarn of example 7 consisting of a copoly(ethylene terephthalate) is inferior to both the poly(ethylene terephthalate) yarn and to the conjugate yarn of example 6 according to our invention.

EXAMPLE 8

Comparison was made in respect of the drawing and dye fastness properties of the following three drawn yarns, all of which were of 36 filaments and 4 denier per filament and differed in the following respects:

Sample (i) Filament yarn of poly(ethylene terephthalate)
Sample (ii) Conjugate filament yarn of our invention and according to example 6.
Sample (iii) Filament yarn of co(polyethylene terephthalate) according to example 7.

The yarns were knitted into hose leg fabrics and dyeings carried out separately with each of the dyestuffs Color Index Disperse Blue 26, Color Index Disperse Blue 56, Color Index Color Index Disperse Blue 122, using the dyeing conditions given in example 2.

It was found in all cases that sample (iii) dyed to a deeper shade than samples (i) and (ii) but (iii) suffered from the grave disadvantage that much of the dye could be removed from the fiber by simple treatments such as solvent extraction, e.g. with methanol, or by reduction clearing as described in example 2. Such treatments led to a complete elimination of, or a drastic reduction in, the depth of shade. Reduction clearing and soaping could not therefore be used and the dye fastness properties of sample (iii) compared with sample (i) were as given in table 2.

TABLE 2

| Dye | Sample | Cross staining | | Rub fastness | | Light fastness |
| --- | --- | --- | --- | --- | --- | --- |
| | | Wool | Nylon | Dry | Wet | |
| (CI Disperse Blue 26) | Sample (iii) | 2-3 | 2 | 4 | 4 | 3-4 |
| | Sample (i) | 4 | 4 | 5 | 5 | 4-5 |
| (CI Disperse Blue 56) | Sample (iii) | 3 | 3 | 3-4 | 4 | 3 |
| | Sample (i) | 5 | 4-5 | 4-5 | 5 | 4 |
| (CI Disperse Blue 122) | Sample (iii) | 2-3 | 4 | 5 | 5 | 2-3 |
| | Sample (i) | 4-5 | 4-5 | 5 | 5 | 3-4 |

The fastness gradings in these tests were obtained by the methods published by the Society of Dyers and Colorists under the title "Standard Methods for the Determination of Color Fastness of Textiles." The fastness gradings were determined by reference to the Geometric Grey Scales for assessing the results of fastness testing.

By contrasting, dyed samples of fabric (ii) could be reduction cleared and soaped as described in example 2 and suffered a relatively slight decrease in shade. The dye fastness properties after these treatments were also superior to those of sample (iii) as shown in table 3.

TABLE 3

| Dye | Sample | Cross staining | | Rub fastness | | Light fastness |
| --- | --- | --- | --- | --- | --- | --- |
| | | Wool | Nylon | Dry | Wet | |
| (CI Disperse Blue 26) | Sample (ii) | 4 | 3-4 | 4-5 | 4-5 | 4-5 |
| | Sample (i) | 4 | 4-5 | 5 | 5 | 4-5 |
| (CI Disperse Blue 56) | Sample (ii) | 4 | 4-5 | 4 | 4 | 4 |
| | Sample (i) | 5 | 4-5 | 4 | 4 | 4 |
| (CI Disperse Blue 122) | Sample (ii) | 4-5 | 4-5 | 5 | 5 | 3-4 |
| | Sample (i) | 4-5 | 4-5 | 5 | 5 | 3-4 |

EXAMPLE 9 i. Poly(tetramethylene terephthalate) of a Viscosity Ratio 2.18 was prepared by a conventional method and was melt spun and drawn to form a yarn.

ii. Poly(ethylene terephthalate) of Viscosity Ratio 1.81 was melt spun and drawn to form a yarn.

iii. A copoly(ethylene terephthalate) containing units derived from poly(ethylene oxide) of average molecular weight 5,000 in quantity such as would result from the reaction of 18 parts by weight per 100 parts by weight of the final copolyester and having Viscosity Ratio 1.91 was prepared according to the method of example 2.

iv. Conjugate filaments were spun from the polyester of (i) as core and (iii) as sheath, the core occupying 85 percent of the cross-sectional area of the filament and the filaments drawn.

v. Conjugate filaments were spun from (ii) as core and (iii) as sheath, the core occupying 85 percent of the cross-sectional area of the filament for 30 seconds and after heat setting of 140° C. for 30 seconds. The values for percentage tensile recovery are given in table 4.

Table 4

| | Yarn (i) | Yarn (iv) | Yarn (ii) | Yarn (v) |
| --- | --- | --- | --- | --- |
| As drawn | | | | 90% |
| After heat setting As drawn | | | | 92% |
| seconds. After heat setting at 140° C. for 30 | 80% | 74% | 55% | 50% |

EXAMPLES 10-15

These examples show that a wide range of content of poly(ethylene oxide) units in the material of the sheath-core conjugate filaments is effective in conferring the property of antisoiling redeposition on the filaments. A drawn yarn composed of filaments of poly(ethylene terephthalate) of Viscosity Ratio 1.81 was used as control. Drawn, conjugate filament yarns were prepared from copolyesters prepared according to the method described in example 2 and containing various proportions of poly(ethylene oxide) melt spun as the sheath about a core of poly(ethylene terephthalate) as used for the control. The proportion of the cross sectional area of the conjugate filaments occupied by the core was 85 percent in each case. The conjugate yarns and the poly(ethylene and terephthalate) control yarn were knitted into hose leg fabrics and subjected to a soiling treatment consisting in washing under standard conditions in aqueous detergent solution in the presence of standard samples of soiled flannellette. In table 5 are given in column 2 the parts by weight of poly(ethylene oxide) used in the preparation of 100 parts by weight of the sheath copolyester, in column 3 the value for reflectance of the fabric before the soiling test, in column 4 the value for reflectance of the yarn after the soiling test and in column 5 the difference in values given in columns 3 and 4.

TABLE 5

| Example | Parts poly- (ethylene oxide) in 100 pts. of copolyester in sheath | Reflectance values | | |
| --- | --- | --- | --- | --- |
| | | Before soiling, A | After soiling, B | Difference, A−B |
| 10 | 0 | 80 | 60 | 20 |
| 11 | 5 | 84 | 69 | 5 |
| 12 | 12 | 80 | 76 | 4 |
| 13 | 17 | 78 | 74 | 4 |
| 14 | 21 | 78 | 75 | 3 |
| 15 | 25 | 79 | 77 | 2 |

The results of the tests show that the poly(ehtylene terephthalate) control (ex. 10) soils badly in comparison with the conjugate fibers of this invention (ex. 11-15), all of which effectively resist soiling.

Samples of the yarns of examples 10 to 15 were also tested for oil release by preparing a knitted fabric from each of the yarns, impregnating each fabric sample with dibutyl phthalate and then washing in detergent solution under standard conditions. The amount of dibutyl phthalate retained on each sample was then determined and the results expressed as the ratio:

Percent oil retained =
Percent oil remaining on conjugate filament sample)
×100
Percent oil remaining on poly(ethylene terephthalate) filament sample.

The results are given in table 6, in which the parts of poly(ethylene oxide) has the same significance as in table 5.

TABLE 6

| Parts poly(ethylene oxide) | 0 | 5 | 12 | 17 | 22 | 25 |
|---|---|---|---|---|---|---|
| Percent oil retained | 100 | 84 | 6 | 9 | 4 | 2 |
|  | 100 | 85 | 8 | 6 | 5 | 4 |

The two sets of figures under % oil retained are the result of duplicate tests. These figures show that the fibers of this invention have good oil-release properties compared with the poly(ethylene terephthalate) control, the best effect being obtained when the amount of poly(ethylene oxide) in the sheath is greater than 5 parts per 100 parts of copolymer.

EXAMPLES 16 to 20

These examples show that a wide range of content of poly(ethylene oxide) units in the material of the sheath in sheath/core conjugate filaments is effective in conferring antistatic properties of the filaments. A drawn yarn composed of filaments of poly(ethylene terephthalate) of Viscosity Ratio 1.81 was used as control. Drawn, conjugate filament yarns were prepared from copolyesters prepared according to the method described in example 2 containing various proportions of poly(ethylene oxide) as the sheath about a core of poly(ethylene terephthalate) as used for the control. The proportion of the cross-sectional area of the conjugate filaments occupied by the core was 85 percent in each case. The antistatic properties of the derived yarns were tested by knitting into hoselegs, washing free of spin finish, drying, rinsing in aqueous potassium bromide (1.5 g. per liter), spin drying and tumble drying at 60° C. The lengthwise electrical resistance of the fabric sample, 7 inches and comprised of six fabric layers, was measured for each sample. The results are given in table 7., in which column 2 shows the parts by weight of poly(ethylene oxide) used in the preparation of 100 parts of the copolyester used for the sheath.

TABLE 7

| Example | Parts poly-(ethylene oxide) per 100 pts. of copolymer in sheath component | Electrical resistance in megohms at relative humidity 65% |
|---|---|---|
| 16 | 0 | >$10^7$ |
| 17 | 12 | $1 \times 10^6$ |
| 18 | 18 | $6 \times 10^5$ |
| 19 | 22 | $3 \times 10^4$ |
| 20 | 25 | $8 \times 10^3$ |

The degree of antistatic protection conferred is inversely related to the electrical resistance. These tests show that the antistatic protection increases as the amount of poly(ethylene oxide) in the sheath increases. It has been established in practical wearer trials under normal conditions that a resistance value of about $10^5$ megohms (according to this test) is adequate for normal antistatic protection.

EXAMPLE 21

This example illustrates the importance of poly(ethylene oxide) unit content of the sheath material in respect of properties. Copoly(ethylene terephthalate) were prepared such as would result from the reaction of 5, of 10 and of 20 parts by weight of poly(ethylene oxide) of average molecular weight 5,000 per 100 parts of the final copoly(ethylene terephthalate). Each of these copoly(ethylene terephthalate)s was used as the sheath material in the preparation of a conjugate filament yarn of which 15 percent of the cross-sectional area was occupied by the sheath, according to the method of example 2. The resultant yarns were tested comparatively in the form of knitted fabrics in respect of antisoiling properties, oil release (test described in examples 10-15) and antistatic properties (test described in examples 16-20). The results of the tests are given in table 8.

TABLE 8

| Poly(ethylene oxide) content of sheath component | 5% | 12% | 20% |
|---|---|---|---|
| *Antisoiling test results | good | good | good |
| Oil release test results | poor | good | good |
| Antistatic test results | poor antistatic effect | poor antistatic effect | good antistatic effect |

*good means there was little soil redeposition.

EXAMPLES 22-25

These examples demonstrate the effectiveness of a range of percentages of cross-sectional area occupied by the sheath of the conjugate filaments of our invention (examples 23-25). A drawn yarn composed of filaments of poly(ethylene terephthalate) of Viscosity Ratio 1.81 was used as control. Drawn, conjugate filament yarns were prepared from a copolyester, prepared according to the method described in example 2 containing a proportion of poly(ethylene oxide) units resulting from the use of 18 parts by weight of poly(ethylene oxide) of average molecular weight 5,000 per 100 parts by weight of copolyester, melt spun as the sheath about a core of poly(ethylene terephthalate) as used for the control. The percentage of the cross-sectional area of the filaments occupied by the sheath was varied as required and is given in column 2 of table 9. The electrical resistance was measured on fabric samples as described in respect of examples 16 to 20 after washing with aqueous detergent and also after carrier dyeing followed by reduction clearing and soaping as described in respect of example 2. The results are given in table 9.

TABLE 9

| Example | Percentage of cross-sectional area occupied by sheath | Electrical resistance, megohms at relative humidity 65% | |
|---|---|---|---|
| | | After washing | After dyeing etc. |
| 22 | 0 | >$10^7$ | >$10^7$ |
| 23 | 7 | $1.6 \times 10^5$ | $9 \times 10^5$ |
| 24 | 15 | $6 \times 10^5$ | $1 \times 10^5$ |
| 25 | 33 | $2.5 \times 10^5$ | $3.5 \times 10^5$ |

EXAMPLE 26

A drawn, sheath-core filament yarn of 36 filaments and 4 denier per filament was prepared according to the method described in example 2. The core was a copolyester of terephthalic and adipic acids with ethylene glycol; the molar ratio of adipic acid to terephthalic acid was 8:92 and the Viscosity Ratio of the copolymer was 1.81. The sheath comprised a co(polyethylene terephthalate) of VIscosity Ratio 1.90 such as would result from the reaction of 18 parts by weight of poly(ehtylene oxide) of average molecular weight 5,000 per 100 parts by weight of the final copolyester.

Dyeing experiments, carried out in accordance with example 8 and in comparison with the poly(ethylene terephthalate) yarn (sample (i) of example 8) showed: (1) that the sheath-core yarn dyed to a deeper shade than the yarn of sample (i) of example 8, (2) that although some loss of shade did occur on reduction clearing of the samples, the resultant color for the sheath-core yarn was still as deep as, or deeper than, the shade obtained for sample (i) of example 8, (3) that the rub fastness and other fastness properties were of the same order as those of sample (i) of example 8.

EXAMPLE 27

A series of drawn yarns, nine in all, was prepared according to the method of example 2. In each case the yarn was 140 denier and of 36 filaments and the filaments consisted of poly(ethylene terephthalate) core of VIscosity Ratio 1.8 and occupying 85 percent of the cross-sectional area of each filament. The sheath in each case was a copoly(ethylene terephthalate) containing structural units derived from poly(ehtylene oxide)s of a variety of valves of average molecular weight. The results of the observation of the behavior on unwinding the package of spun yarn and the behavior on cold drawing was expressed in terms of stickiness and is given in table 10. Column 1 gives the parts by weight of poly(ethylene oxide) reacted to give 100 parts by weight of the copoly(ethylene terephthalate). The numbers at the top of columns, 2, 3 and 4 are the average molecular weight of the poly(ethylene oxide) on which the sheath copoly(ethylene terephthalate) was based.

TABLE 10

| Parts by weight of poly(ethylene oxide) | Average molecular weight poly(ethylene oxide) | | |
|---|---|---|---|
| | 1,540 | 4,000 | 6,000 |
| 25 | Very sticky | Sticky | Non-sticky. |
| 18 | Sticky | Non-sticky | Do. |
| 10 | Non-sticky | do | Do. |

Taking into account the results given in table 10, it is relatively easy to ensure that using a specified average molecular weight of poly(alkylene oxide) the appropriate quantity is reacted for 100 parts of sheath copoly(ethylene terephthalate to give the desired degree of freedom from spun yarn stickiness.

EXAMPLE 28

A sheath-core conjugate yarn of 200 filaments and 1,970 total spun denier was spun according to the conditions given in example 2. The core was poly(ethylene terephthalate of Viscosity Ratio 1.81 and occupied 85 percent of the total cross-sectional area of the filament. The sheath was a copoly(ethylene terephthalate) of Viscosity Ratio 1.82 containing units derived from poly(ethylene oxide) of average molecular weight 5,000 in quantity such as would result from the reaction of 18 parts by weight per 100 parts by weight of the final copolyester.

The spun yarn was plied up so as to give a tow of total spun denier 250,000. This tow was then drawn on a conventional staple draw-frame using a pre-draw-frame bath containing a 3 percent by weight concentration of a processing finish comprising a condensate of lauric acid and 12 mols of ethylene oxide, a steam draw-bath and a draw-ratio of 3.6:1. The drawn tow was mechanically crimped to give 12 crimps per inch, heat-set at 150° C. for 20 minutes and cut to staple fiber of staple length 3 inch.

The staple fiber was then processed to yarn on conventional worsted machinery and the yarn was knitted to give a fabric. The fabric was found to have good antistatic properties and, when subjected to the test described in example 2, the lengthwise electrical resistance was $2 \times 10^5$ megohms measured at 65 percent relative humidity.

What we claim is:

1. A sheath-core, conjugate, polyester filament wherein
   the core consists of a fiber-forming, linear polyester or copolyester based on a simple glycol, or of a fiber-forming, linear copolyester in the molecular chain of which there are, in addition to units based on a simple glycol, poly(alkylene oxide)-containing units selected from the group consisting of oxyethylene and oxypropylene in proportion such as would result from the reaction of less than 5 parts by weight of poly(alkylene oxide) per 100 parts by weight of the final copolyester,
   and the sheath consists of a fiber-forming copolyester, or a fiber-forming admixture of copolyester, the polyester or copolyester admixture of the sheath having structural units containing poly(alkylene oxide) radicals selected from the group consisting of oxyethylene and oxypropylene the proportion of the structural units containing poly(alkylene oxide) radicals being such as would result from the reaction of not less than 5 parts and not greater than 60 parts by weight of poly(alkylene oxide) of average molecular weight at least 500 per 100 parts by weight of the final copolyester or copolyester admixture, and which has been oriented by cold drawing.

2. A sheath-core conjugate filament according to claim 1 wherein the proportion of the structural units of the copolyester of the core containing poly(alkylene oxide) radicals is such as would result from no more than 3 parts by weight of poly(alkylene oxide) per 100 parts by weight of the copolyester of the core.

3. A sheath-core conjugate filament according to claim 1 wherein the sheath component occupies no less than 5 percent and no more than 40 percent of the cross-sectional area of the filament.

4. A sheath-core conjugate filament according to claim 1 wherein the sheath component occupies no less than 7 and no more than 33 percent of the cross-sectional area of the filament.

5. A sheath-core conjugate filament according to claim 1 wherein the poly(alkylene oxide) of average molecular weight at least 500 is of average molecular weight not less than 1,000 and not greater than 20,000.

6. A sheath-core conjugate filament according to claim 5 wherein the average molecular weight is not greater than 6,000.

7. A sheath-core conjugate filament according to claim 1 wherein the proportion of the structural units of the copolyester or admixed copolyester of the sheath containing poly(alkylene oxide) radicals is such as would result from the reaction of not more than 40 parts of poly(alkylene oxide) per 100 parts by weight of the final copolyester or copolyester admixture.

8. A sheath-core conjugate filament according to claim 1 wherein the core material derives its fiber-forming properties from terephthalate linkages and the sheath is composed of a copolyester, or has as a constituent a copolyester, based on terephthalate units.

9. A sheath-core conjugate filament according to claim 8 wherein the terephthalate is ethylene terephthalate or tetramethylene terephthalate.

10. A sheath-core conjugate filament according to claim 1 wherein the core is composed of poly(ehtylene terephthalate) and the sheath is composed of a copolyester of ethylene terephthalate and polyoxyethylene terephthalate.

11. A process for the preparation of a conjugate filament by the extrusion in sheath-core relationship of a. a stream of molten, fiber-forming, polyester or copolyester based on a simple glycol or copolyester in the molecular chain of which there are, in addition to units based on a simple glycol, poly(alkylene oxide)-containing units selected from the group consisting of oxyethylene and oxypropylene in proportion such as would result from the reaction of less than 5 parts by weight of poly(alkylene oxide) per 100 parts by weight of the final copolyester, and b. a stream of copolyester or admixed copolyester of which the proportion of the structural units containing poly(alkylene oxide) radicals selected from the group consisting of oxyethylene and oxypropylene is such as would result from the reaction of not less than 5 and not greater than 60 parts by weight of poly(alkylene oxide) of average molecular weight 500 per 100 parts by weight of the final copolyester or copolyester admixture, (a) being the core and (b) being the sheath, and allowing the composite stream to solidify to form a filament and subsequently orienting by cold drawing.

12. A process for the preparation of a conjugate filament according to claim 12 wherein the proportion of the structural units of the copolyester of component (a) containing poly(alkylene oxide) radicals is such as would result from the reaction of not more than 3 parts by weight of poly(alkylene oxide) per 100 parts of the component (a).

13. A process for the preparation of a conjugate filament according to claim 12 wherein component (b) occupies no less than 5 percent and no more than 40 percent of the cross-sectional area of the filament.

14. A process for the preparation of a conjugate filament according to claim 12 wherein the poly(alkylene oxide) of average molecular weight at least 500 is of average molecular weight not less than 1,000 and not greater than 20,000.

15. A process for the preparation of a conjugate filament according to claim 15 wherein the average molecular weight is not greater than 6,000.

16. A process for the preparation of a conjugate filament according to claim 12 wherein the proportion of the structural units of the copolyester or admixed copolyester of the sheath containing poly(alkylene oxide) radicals is such as would result from the reaction of not more than 40 parts by weight of poly(alkylene oxide) per 100 parts by weight of the final copolyester or copolyester admixture.

17. A process for the preparation of a conjugate filament according to claim 12 wherein the core material derives its fiber-forming properties from terephthalate units and the sheath is composed of a copolyester, or has as a constituent a copolyester, based on terephthalate units.

18. A process for the preparation of a conjugate filament according to claim 16 wherein the terephthalate is ethylene terephthalate or tetramethylene terephthalate.

19. A process according to claim 12 wherein the core material is poly(ethylene terephthalate) and the sheath material is a copolyester of ethylene terephthalate and polyoxyethylene terephthalate.

20. A textile material composed of, or containing, fibers according to claim 1.

* * * * *